United States Patent
Park et al.

(10) Patent No.: US 10,504,455 B2
(45) Date of Patent: Dec. 10, 2019

(54) DISPLAY DEVICE AND METHOD OF DRIVING THE SAME

(71) Applicant: SAMSUNG DISPLAY CO., LTD., Yongin-si, Gyeonggi-do (KR)

(72) Inventors: Haengwon Park, Seongnam-si (KR); Hyeonseok Bae, Suwon-si (KR)

(73) Assignee: Samsung Display Co., Ltd. (KR)

( * ) Notice: Subject to any disclaimer, the term of this patent is extended or adjusted under 35 U.S.C. 154(b) by 45 days.

(21) Appl. No.: 15/839,361

(22) Filed: Dec. 12, 2017

(65) Prior Publication Data
US 2018/0166024 A1    Jun. 14, 2018

(30) Foreign Application Priority Data
Dec. 12, 2016   (KR) .................. 10-2016-0168659

(51) Int. Cl.
*G09G 3/34* (2006.01)
*H04N 9/31* (2006.01)
*G09G 3/36* (2006.01)
*G09G 3/3208* (2016.01)

(52) U.S. Cl.
CPC ......... *G09G 3/3413* (2013.01); *G09G 3/3614* (2013.01); *G09G 3/3648* (2013.01); *G09G 3/3677* (2013.01); *H04N 9/3182* (2013.01); *G09G 3/3208* (2013.01); *G09G 2310/021* (2013.01); *G09G 2310/0235* (2013.01); *G09G 2310/0286* (2013.01)

(58) Field of Classification Search
CPC .................................................. G09G 3/3413
See application file for complete search history.

(56) References Cited

U.S. PATENT DOCUMENTS

| 8,248,393 | B2 | 8/2012 | Hekstra et al. | |
|---|---|---|---|---|
| 9,153,185 | B2 | 10/2015 | Yoo et al. | |
| 2003/0117355 | A1 | 6/2003 | Yamauchi | |
| 2007/0229533 | A1 | 10/2007 | Dalal et al. | |
| 2008/0067512 | A1* | 3/2008 | Lee | G09G 3/3659 257/59 |
| 2011/0074670 | A1 | 3/2011 | Teegan et al. | |
| 2013/0328950 | A1 | 12/2013 | Vasquez et al. | |

(Continued)

FOREIGN PATENT DOCUMENTS

| KR | 1001508720000 | 6/1998 |
|---|---|---|
| KR | 1005034300000 | 7/2005 |

(Continued)

*Primary Examiner* — Kent W Chang
*Assistant Examiner* — Chayce R Bibbee
(74) *Attorney, Agent, or Firm* — Innovation Counsel LLP

(57) ABSTRACT

A display device is capable of improving a charge rate of a pixel, the display device including: first color pixels; second color pixels; third color pixels; a gate lines connected to the first, the second and the third color pixels and extending along a first direction; a data line connected to at least one of the first, the second and the third color pixels and extending along a second direction; a first start line connected to at least one of the plurality of first color pixels; a second start line connected to at least one of the plurality of second color pixels; a third start line connected to at least one of the plurality of third color pixels; a gate driver connected to the first start line, the second start line, the third start line, and the gate lines; and a data driver connected to the data line.

18 Claims, 11 Drawing Sheets

(56) References Cited

U.S. PATENT DOCUMENTS

2014/0152676 A1    6/2014  Rohn et al.
2016/0182042 A1*   6/2016  Kim .................... G09G 3/3225
                                                         345/213

FOREIGN PATENT DOCUMENTS

| KR | 1005335240000  | 11/2005 |
|----|----------------|---------|
| KR | 1006008670000  | 7/2006  |
| KR | 1020070051263  | 5/2007  |
| KR | 1020070074176  | 7/2007  |
| KR | 1007555490000  | 8/2007  |
| KR | 1007901340000  | 12/2007 |
| KR | 1008740420000  | 12/2008 |
| KR | 1020090034891  | 4/2009  |
| KR | 1020100003247  | 1/2010  |
| KR | 1009892260000  | 10/2010 |
| KR | 1012451200000  | 3/2013  |
| KR | 1013079500000  | 9/2013  |
| KR | 1013174650000  | 10/2013 |
| KR | 1020150091474  | 8/2015  |
| KR | 1020160083139  | 7/2016  |

* cited by examiner

RED

DISPLAY DEVICE AND METHOD OF DRIVING THE SAME

CROSS-REFERENCE TO RELATED APPLICATION

This application claims priority under 35 U.S.C. § 119 to Korean Patent Application No. 10-2016-0168659, filed on Dec. 12, 2016, in the Korean Intellectual Property Office (KIPO), the disclosure of which is incorporated by reference herein in its entirety.

TECHNICAL FIELD

Embodiments of the present inventive concept relate to a display device and a method of driving the display device.

DISCUSSION OF RELATED ART

Display devices may be classified into liquid crystal display ("LCD") devices, organic light emitting diode ("OLED") display devices, plasma display panel ("PDP") devices, electrophoretic display devices and the like based on a light emitting scheme thereof.

Among them, liquid crystal display ("LCD") devices are one of most widely used types of the flat panel display ("FPD") devices. An LCD device includes two substrates including electrodes formed thereon and a liquid crystal layer interposed therebetween. Upon applying voltage to the two electrodes, liquid crystal molecules of the liquid crystal layer are rearranged such that an amount of transmitted light is controlled in the LCD device.

In recent time, as the number of pixels increases in accordance with the tend toward a high resolution of a display device, a problem of image quality degradation may occur due to an insufficient charge rate of a pixel.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present inventive concept may be directed to a display device which may substantially prevent image degradation by improving a charge rage of a pixel and to a method of driving the display device.

According to an exemplary embodiment, a display device includes: a plurality of first color pixels representing a first color; a plurality of second color pixels representing a second color; a plurality of third color pixels representing a third color; a plurality of gate lines connected, to the plurality of first color pixels, the plurality of second color pixels and the plurality of third color pixels and extending along a first direction; a data line connected to at least one of the plurality of first color pixels, the plurality of second color pixels and the plurality of third color pixels and extending along a second direction; a first start line connected to at least one of the plurality of first color pixels; a second start line connected to at least one of the plurality of second color pixels; a third start line connected to at least one of the plurality of third color pixels; a gate driver connected to the first start line, the second start line, the third start line, and the plurality of gate lines; and a data driver connected to the data line.

The plurality of gate lines may include a first gate line including (3m−2)-th gate lines, a second gate line including (3m−1)-th gate lines, and a third gate line including 3m-th gate lines, in being a natural number. The first gate line may be connected to the first color pixels, the second gate line may be connected to the second color pixels, and the third gate line may be connected to the third color pixels.

The first color may be red, the second color may be green, and the third color may be blue.

The display device may further include a first pixel group including one of the plurality of first color pixels, one of the plurality of second color pixels, and one of the plurality of third color pixels that are arranged adjacent to each other along the second direction, and a second pixel group including one of the plurality of first color pixels, one of the plurality of second color pixels, and one of the plurality of third color pixels that are arranged adjacent to the first pixel group along the second direction. The first pixel group and the second pixel group may be arranged alternately along the second direction and connected to different data lines.

The first pixel group and the second pixel group may be arranged alternately along the first direction and are connected to different data lines.

The first pixel group may be connected to a first data line and the second pixel group may be connected to a second data line which is disposed adjacent to the first data line.

The first data line and the second data line may receive data voltages having different polarity respectively.

The display device may further include a third pixel group comprising one of the plurality of first color pixels, one of the plurality of second color pixels, and one of the plurality of third color pixels that are arranged adjacent to each other along the second direction, the third pixel group being disposed adjacent to the first pixel group along the first direction, and a fourth pixel group comprising one of the plurality of first color pixels, one of the plurality of second color pixels, and one of the plurality of third color pixels that are arranged adjacent to the third pixel group along the second direction. The third pixel group may be connected to the second data line and the fourth pixel group may be connected to a third data line disposed adjacent to the second data line, the third data line receives data voltage having the same polarity as the first data line.

The gate driver may include a plurality of stages respectively corresponding to the plurality of gate lines, (3m−2)-th stages of the plurality of stages may be connected to each other, (3m−1)-th stages of the plurality of stages may be connected to each other, and 3m-th stages of the plurality of stages may be connected to each other.

The data line may include a first data line and a second data line arranged alternately along the first direction. The data driver may apply a positive voltage to the first data line and a negative voltage to the second data line.

The display device may further include a timing controller for driving the gate driver and the data driver.

Lengths of the first color pixel, the second color pixel, and the third color pixel in the first direction may be longer than lengths of the first color pixel, the second color pixel, and the third color pixel in the second direction, respectively.

The plurality of first color pixels, the plurality of second color pixels, and the plurality of third color pixels may be driven sequentially.

According to an exemplary embodiment, a method of driving a display device includes: turning on a plurality of first color pixels using a first start signal output from a first start line; turning on a plurality of second color pixels using a second start signal output from a second start line; and turning on a plurality of third color pixels using a third start signal output from a third start line.

The first color pixel may be connected to a first gate line extending along a first direction, the first gate line including a plurality gate lines disposed every three gate lines along a second direction, the second color pixel may be connected to a second gate line extending along the first direction, the second gate line including gate, lines disposed every three gate lines along the second direction, and the third color pixel may be connected to a third gate line extending along the first direction, the third gate line including gate lines disposed every three gate lines along the second direction, where m is a natural number. The second gate line may be disposed between the first gate line and the third gate line Turning on of the plurality of first color pixels using the first start signal output from the first start line may include sequentially applying gate signals to the first gate line along the second direction, turning on of the plurality of second color pixels using the second start signal output front the second vertical start line may include sequentially applying gate signals to the second gate line along the second direction, and turning on of the plurality of third color pixels using the third start signal output from the third start line may include sequentially applying gate signals to the third gate line along the second direction.

The sequentially applying gate signals to the second gate line along the second direction may be performed after sequentially applying gate signals to the first gate line along the second direction.

The sequentially applying gate signals to the third gate line along the second direction may be performed after sequentially applying gate signals to the second gate line along the second direction.

The first color pixel may be a red pixel, the second color pixel may be a green pixel, and the third color pixel may be a blue pixel.

The foregoing is illustrative only and is not intended to be in any way limiting. In addition to the illustrative aspects, exemplary embodiments and features described above, further aspects, exemplary embodiments and features will become apparent by reference to the drawings and the following detailed description.

BRIEF DESCRIPTION OF THE DRAWINGS

A more complete appreciation of the present inventive concept will become more apparent by describing in detail exemplary embodiments thereof with reference to the accompanying drawings, wherein.

DETAILED DESCRIPTION

Figure 1:
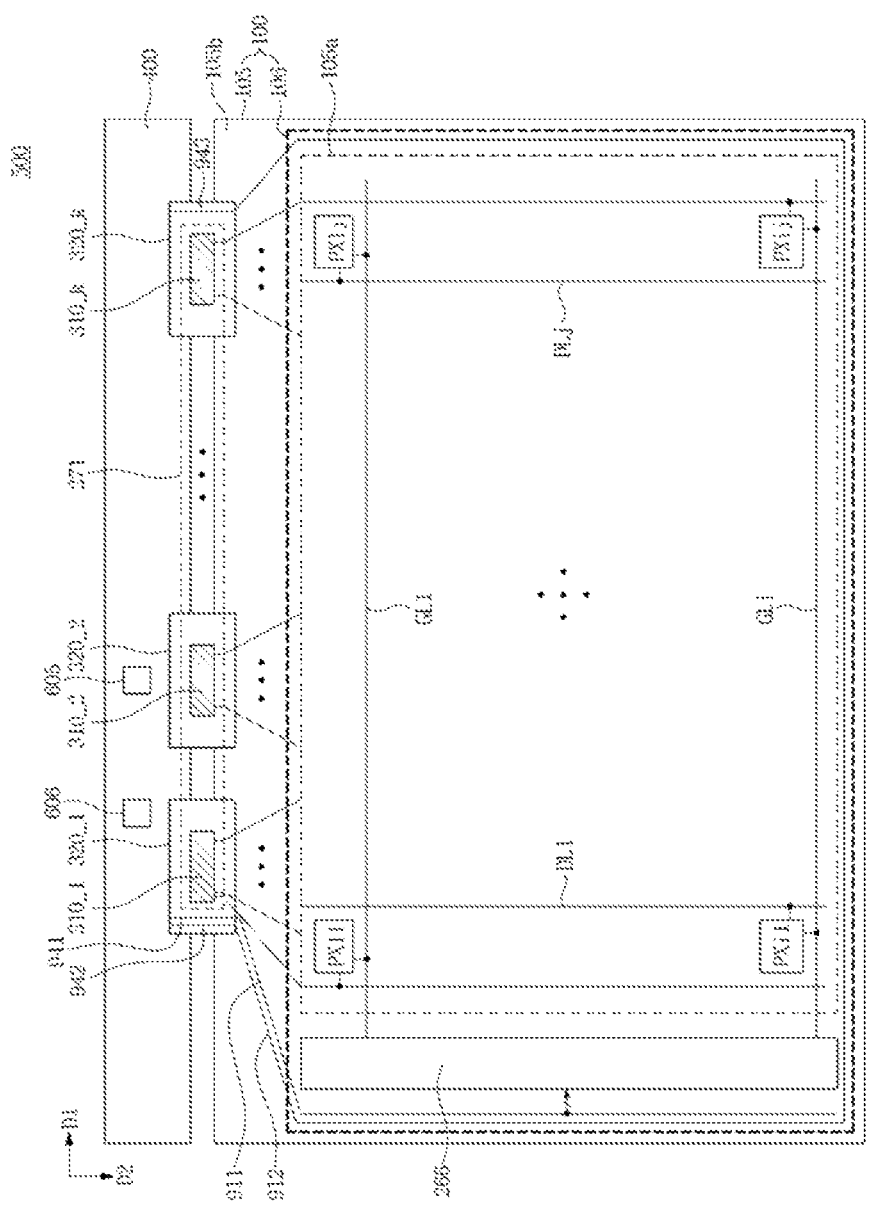
FIG. 1 is a view illustrating a display device according to an exemplary embodiment.

Exemplary embodiments will now be described more fully hereinafter with reference to the accompanying drawings. Although the inventive concept may be modified in various manners and have several exemplary embodiments, exemplary embodiments are illustrated in the accompanying drawings and will be mainly described in the specification. However, the scope of the inventive concept is not limited to the exemplary embodiments and should be construed as including all the changes, equivalents and substitutions included in the spirit and scope of the inventive concept.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be, directly below the other layer, area, or plate, or intervening layers, areas, or plates may be present therebetween. Conversely, when a layer, area, or plate is referred to, as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present inventive concept and like reference numerals refer to like elements throughout the specification.

Hereinafter, a display device according to an exemplary embodiment will be described in detail with reference to FIGS. 1 to 7B.

Figure 2:
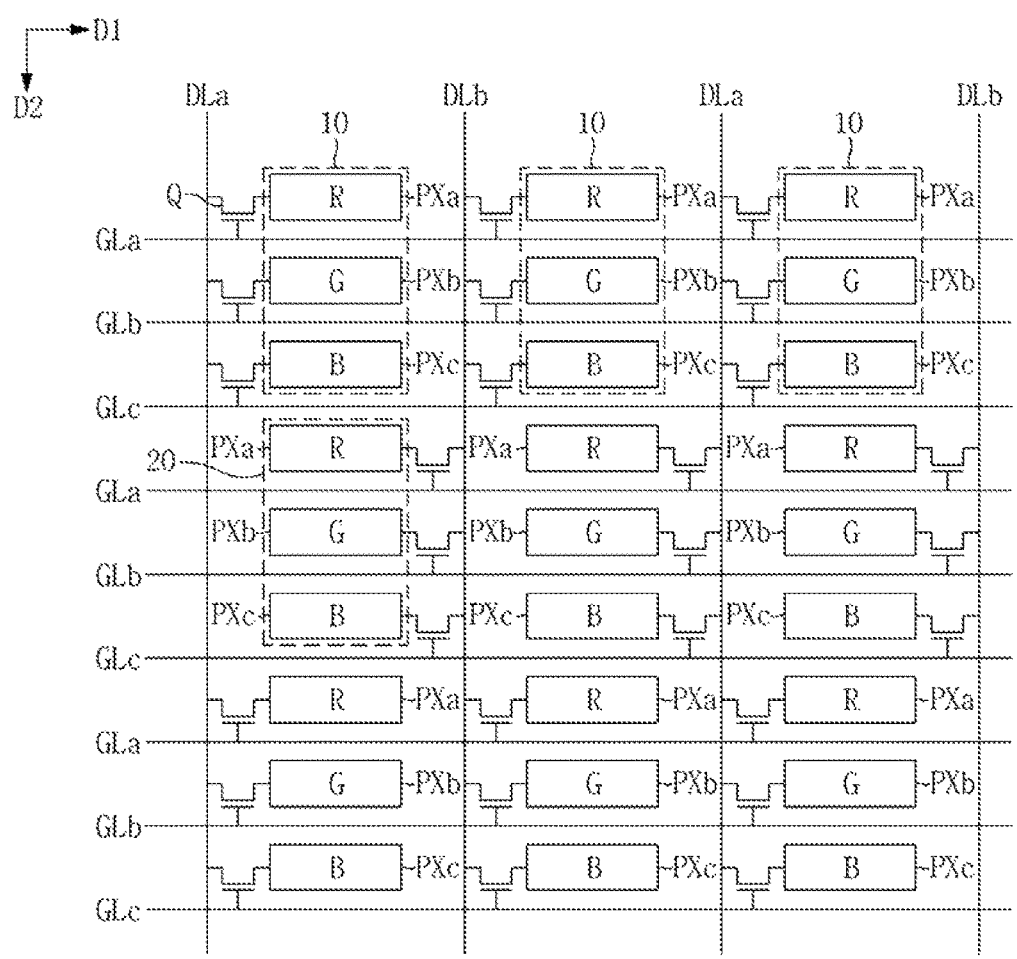
FIG. 2 is a view enlarging a part of a display area of the display device of FIG. 1.

FIG. 1 is a view illustrating a display device according to an exemplary embodiment, and FIG. 2 is a view enlarging a portion of a display area of the display device of FIG. 1.

As illustrated in FIG. 1, a display device 500 according to an exemplary embodiment includes a display panel 100, a data driver 271, a gate driver 266, a circuit board 400, a timing controller 606 and a power supply portion 605.

The display panel 100 includes a first panel 105 and a second panel 106. The first panel 105 and the second panel 106 face each other. The first panel 105 includes a display area 105a and a non-display area 105b.

The display panel 100 may be, for example, a liquid crystal display (LCD) panel or an organic light emitting diode (OLED) display panel used in various types of display devices. In the case that the display panel 100 is an LCD panel, a liquid crystal layer may be disposed between the first panel 105 and the second panel 106. In the case that the display panel 100 is air OLED display panel, an organic light emitting layer may be disposed between the first panel 105 and the second panel 106.

The first panel 105 includes a plurality of gate lines GL1 to GLi, a plurality of data lines DL1 to DLj, a common line 912 and a plurality of pixels PX11 to PXij. The gate lines GL1 to GLi, the data lines, DLj and the pixels PX11 to PXij are located on a first substrate of the first panel 105.

The second panel 106 includes a light blocking layer (not illustrated) which defines a pixel area. In an exemplary embodiment, the light blocking layer may be located on the first panel 105. The light blocking layer substantially prevents a light from being emitted toward a portion except the pixel area.

The data lines DL1 to DLj cross the gate lines GL1 to GLi. The data lines DL1 to DLj extend to the non-display area 105b to be connected to the data driver 271.

The data driver 271 includes a plurality of data driving integrated circuits ("ICs") 310_, 310_2, . . . and 310_k. The data driving ICs 310_1, 310_2, . . . and 310_k receive digital image data signals and a data control signal from a timing controller 606. The data driving ICs 310_1, 310_2, . . . and 310_k sample the digital image data signals according to the data control signal, latch the sampled digital image data signals corresponding to one horizontal line in each horizontal period and apply the latched image data signals to the data lines DL1 to DLj. That is, the data driving ICs 310_1, 310_2, . . . and 310_k convert the digital image data signals supplied from the timing controller 606 into analog image signals using a gamma voltage input from the power supply portion 605 and apply the converted analog image signals to the data lines DL1 to DLj.

The data driving ICs 310_1, 310_2, . . . and 310_k are mounted on data carriers 320_1, 320_2, . . . and 320_k, respectively. The data carriers 320_1, 320_2, . . . and 320_k are connected between the circuit board 400 and the display panel 105. For example, each of the data carriers 320_1, 320_2, . . . and 320_k may be electrically connected between the circuit board 400 and the non-display area 105b of the display panel 105.

The timing controller 606 and the power supply portion 605 described above may be disposed on the circuit board 400.

The data carriers 320_1, 320_2, . . . and 320_k include input lines for transmitting various signals supplied from the timing controller 606 and the power supply portion 605 to the data driving ICs 310_1, 310_2, . . . and 310_k and output lines for transmitting image data signals output from the data driving ICs 310_1, 310_2, . . . and 310_k to the corresponding ones of the data lines DL1 to DLj.

A data carrier at a leftmost edge, e.g., the data carrier 320_1, may include a first auxiliary line 941 and a second auxiliary line 942 for transmitting various signals and a common voltage supplied from the timing, controller 606 and the power supply portion 605 to the first panel 105.

A data carrier at a rightmost edge, e.g., the data carrier 320_k may include a third auxiliary line 943 for transmitting the common voltage supplied from the power supply portion 605 to the first panel 105.

The first auxiliary line 941 is connected to a gate control line 911 of the first panel 105. The gate control line 911 transmits various signals applied through the first auxiliary line 941 to the gate driver 266.

The common line 912 transmits the common voltage applied through the second and third auxiliary lines 942 and 943 to a common electrode of the second panel 106. The common line 912 may surround three sides of the display area 105a. The common electrode of the second panel 106 is connected to the common line 912 of the first panel 105 through a short-circuit portion (not illustrated). The common electrode receives the common voltage from the common line 912 through the short-circuit portion.

The gate control line 911 and the common line 912 may be formed on the non-display area 105b of the first panel 105 in a line-on-glass manner.

The pixels PX11 to PXij are arranged in a matrix configuration in the display area 105a of the first panel 105. In addition, a length of the pixels PX11 to PXij in a first direction D1 may be longer than a length of the pixels PX11 to PXij in a second direction D2.

There are "j" number of pixels arranged along a p-th (p being one selected from 1 to i) horizontal line (hereinafter, p-th horizontal line pixels), which are connected to the first to j-th data lines DL1 to DLj, respectively. In addition, the p-th horizontal line pixels are connected to the p-th gate line in common. Accordingly, the p-th horizontal line pixels receive a p-th gate signal as a common signal. That is, "j"

number of pixels disposed in the same horizontal line receive the same gate signal, while pixels disposed in different horizontal lines receive different gate signals, respectively.

Referring to FIGS. 1 and 2, the plurality of gate lines GL1 to GLi may include a first gate line GLa, a second gate line GLb, and a third gate line GLc. The first gate line GLa includes (3m−2)-th gate lines, the second gate line GLb includes (3m−1)-th gate lines, and the third gate line GLc includes 3m-th gate lines, where m is a natural number.

The plurality of pixels connected to the first gate line GLa, which are first color pixels PXa representing a first color, may be disposed adjacent to each other along the first direction D1 in which the first gate line GLa extends. The plurality of pixels connected to the second gate line GLb, which are second color pixel PXb representing a second color, may be disposed adjacent to each other along the first direction D1 in which the second gate line GLb extends. The plurality of pixels connected to the third gate line GLc, which are third color pixel PXc representing a third color, may be disposed adjacent to each other along the first direction D1 in which the third gate line GLc extends.

For example, the first color pixels PXa connected to the first gate line GLa are red pixels R disposed adjacent to each other along the first direction D1, the second color pixels PXb connected to the second gate line GLb are green pixels G disposed adjacent to each other along the first direction D1, and the third color pixels PXc connected to the third gate line GLc are blue pixels B disposed adjacent to each other along the first direction D1.

In addition, the plurality of first color pixels PXa connected to one of the plurality of first gate lines GLa and disposed adjacent to each other along the first direction D1 may be spaced apart from the plurality of first color pixels PXa connected to another of the plurality of first gate lines GLa and disposed adjacent to each other along the first direction D1, with the second color pixels PXb and the third color pixels PXc disposed therebetween. The plurality of second color pixels PXb connected to one of the plurality of second gate lines GLb and disposed adjacent to each other along the first direction D1 may be spaced apart from the plurality of second color pixels PXb connected to another of the plurality of second gate lines GLb and disposed adjacent to each other along the first direction D1, with the first color pixels PXa and the third color pixels PXc disposed therebetween. The plurality of third color pixels PXc connected to one of the plurality of third gate lines GLc and disposed adjacent to each other along the first direction D1 may be spaced apart from the plurality of third color pixels PXc connected, to another of the plurality of third gate lines GLc and disposed adjacent to each other along the first direction D1, with the first color pixels PXa and the second color pixels PXb disposed therebetween.

That is, a pixel group which includes the first color pixel PXa, the second color pixel PXb, and the third color pixel PXc which represent different colors may be arranged repetitively along the second direction D2. For example, as illustrated in FIG. 2, a first pixel group 10 which includes the first color pixel PXa which is the red pixel R, the second color pixel PXb which is the green pixel G, and the third color pixel PXc which is the blue pixel B, and a second pixel group 20 which includes the first color pixel PXa which is the red pixel R, the second color pixel PXb which is the green pixel G, and the third color pixel PXc may be arranged along the second direction D2.

In addition, the plurality of data lines DL1 to DLj may include a first data line DLa and a second data line DLb. The first data line DLa and the second data line DLb may be arranged alternately along the first direction D1. For example, the first data line DLa may include odd-numbered data lines, e.g., a (2n−1)-th data line D2n−1, and the second data line DLb may include even-numbered data lines, e.g., s 2n-th data line D2n.

According to an exemplary embodiment, the plurality of pixels PX11 to PXij may each be included in a first pixel group 10 or a second pixel group 20. The first pixel group 10 may include one of the plurality of first color pixels PXa, one of the plurality of second color pixels PXb, and one of the plurality of third color pixels PXc that are adjacent to each other along the second direction D2. In addition, the second pixel group 20 includes one of the plurality of first color pixels PXa, one of the plurality of second color pixels PXb, and one of the plurality of third color pixels PXc which are adjacent to the first pixel group 10 along the second direction D2. In such an exemplary embodiment, the first pixel group 10 and the second pixel group 20 are disposed alternately along the second direction D2, and are connected to different data lines. For example, as illustrated in FIG. 2, the plurality of first color pixels PXa, the plurality of second color pixels PXb, and the plurality of third color pixels PXc included in the first pixel group 10 are connected to the respective first data line DLa, and the plurality of first color pixels PXa, the plurality of second color pixels PXb, and the plurality of third color pixels PXc included in the second pixel group 20 are connected to the respective second data line DLb.

Each pixel may include a pixel transistor Q, a liquid crystal capacitor (not illustrated) and a storage capacitor (not illustrated). The pixel transistor Q is a thin film transistor.

The pixel transistor Q is turned in response to a gate signal applied from the gate line. The turned-on pixel transistor Q transmits the analog image data signal applied from the data line to the liquid crystal capacitor and the storage capacitor.

The liquid crystal capacitor includes a pixel electrode, a common electrode which opposes the pixel electrode and a liquid crystal layer inter posed therebetween.

The storage capacitor includes a pixel electrode, an opposing electrode which opposes the pixel electrode and an insulating layer interposed therebetween. Herein, the opposing electrode may be a previous gate line or a transmission line which transmits the common voltage.

Figure 3:
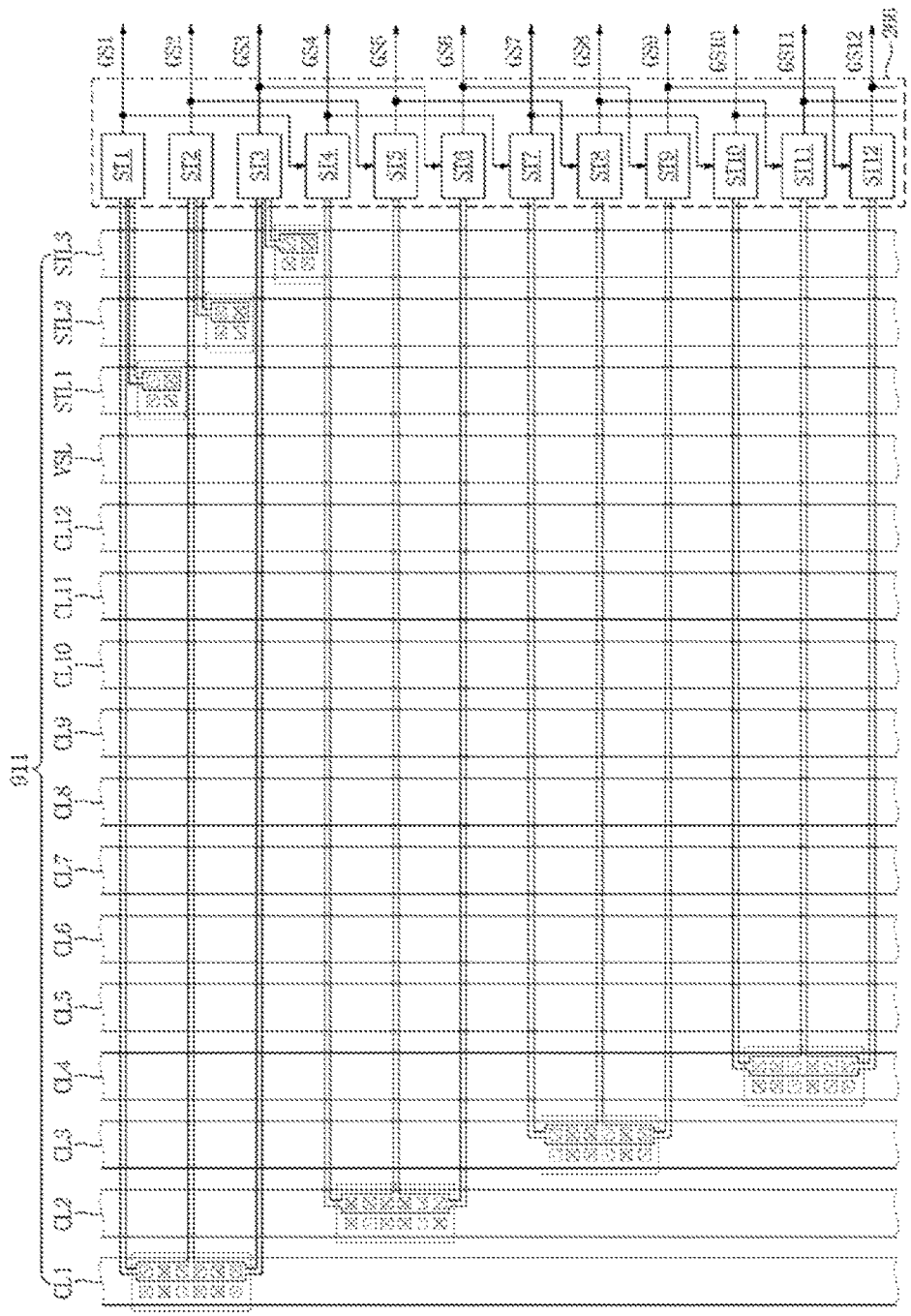
FIG. 3 is a view illustrating a connection relationship between a gate control line and a gate driver of FIG. 1.
Figure 4A:
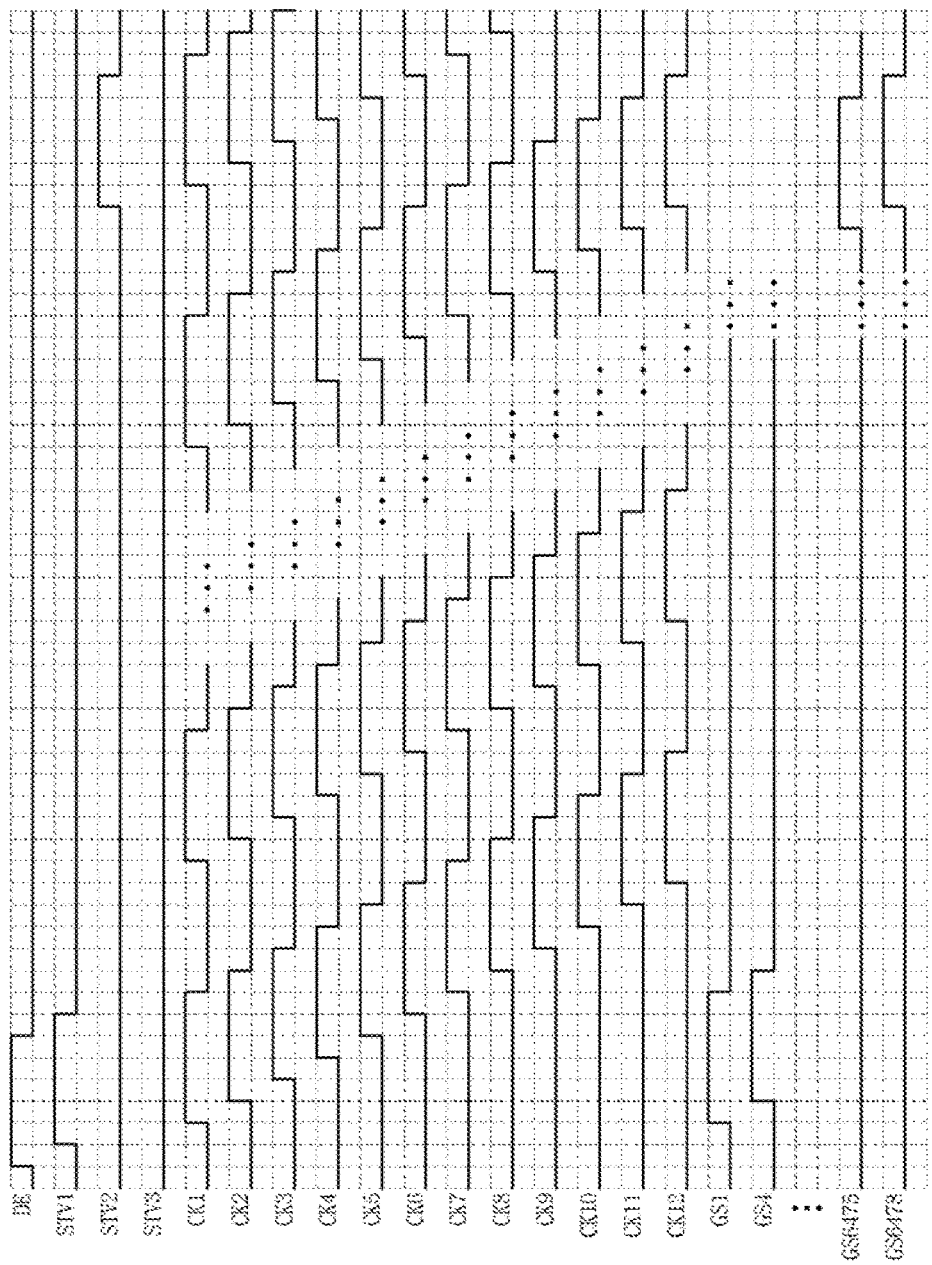
FIGS. 4A, 4B and 4C are views illustrating waveforms of various signals applied to the gate control line of FIG. 3 and gate signals output from the gate driver of FIG. 3.
Figure 4B:
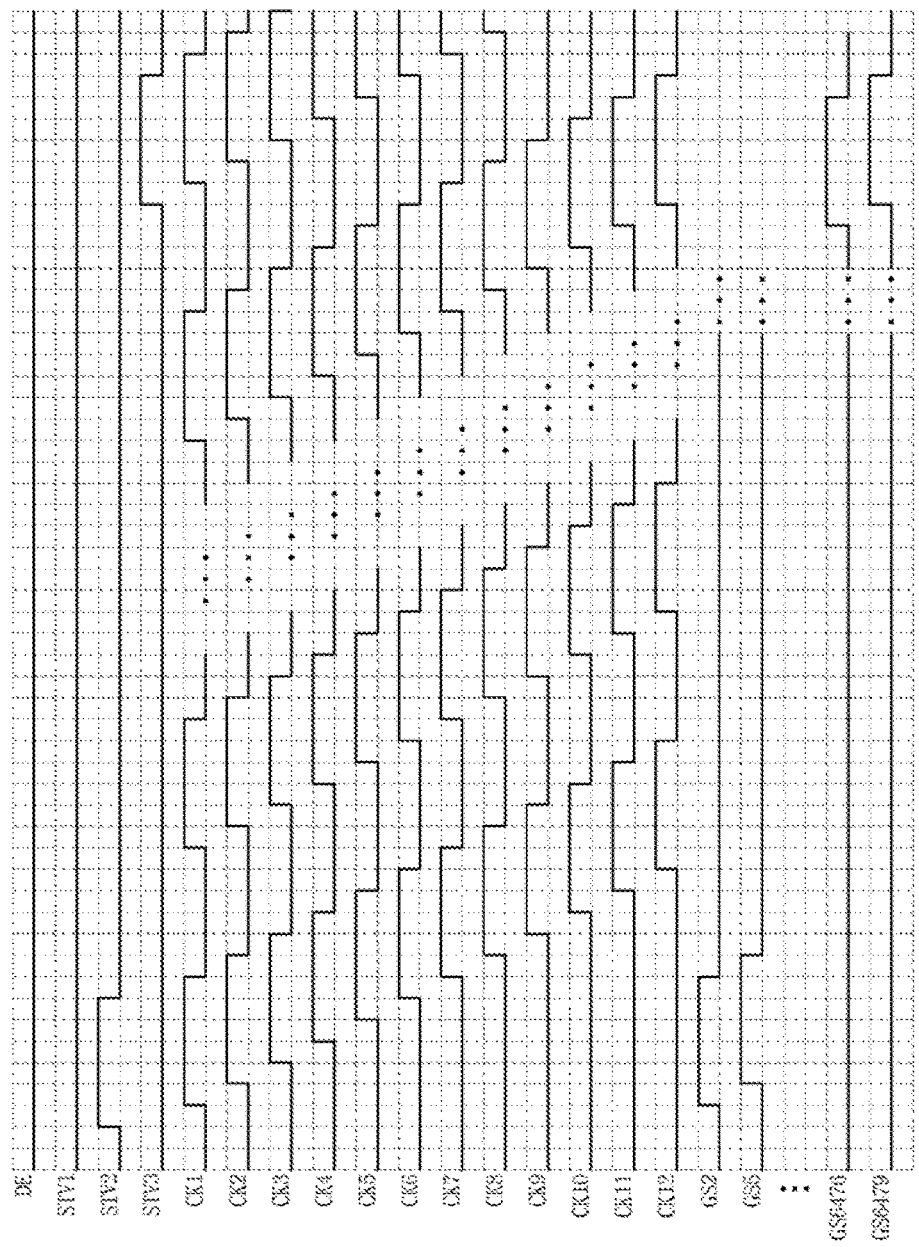
Figure 4C:
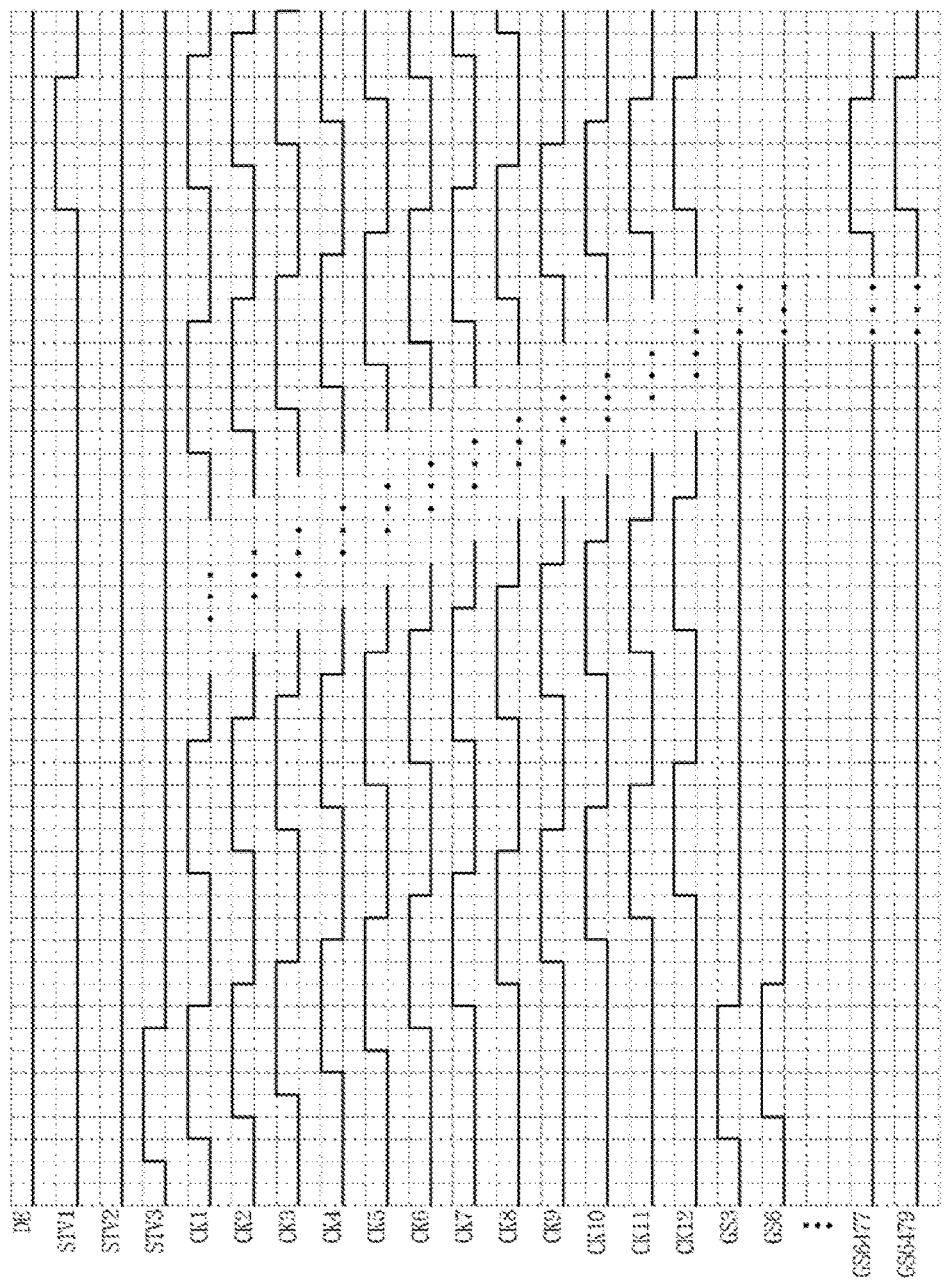
Figure 5A:
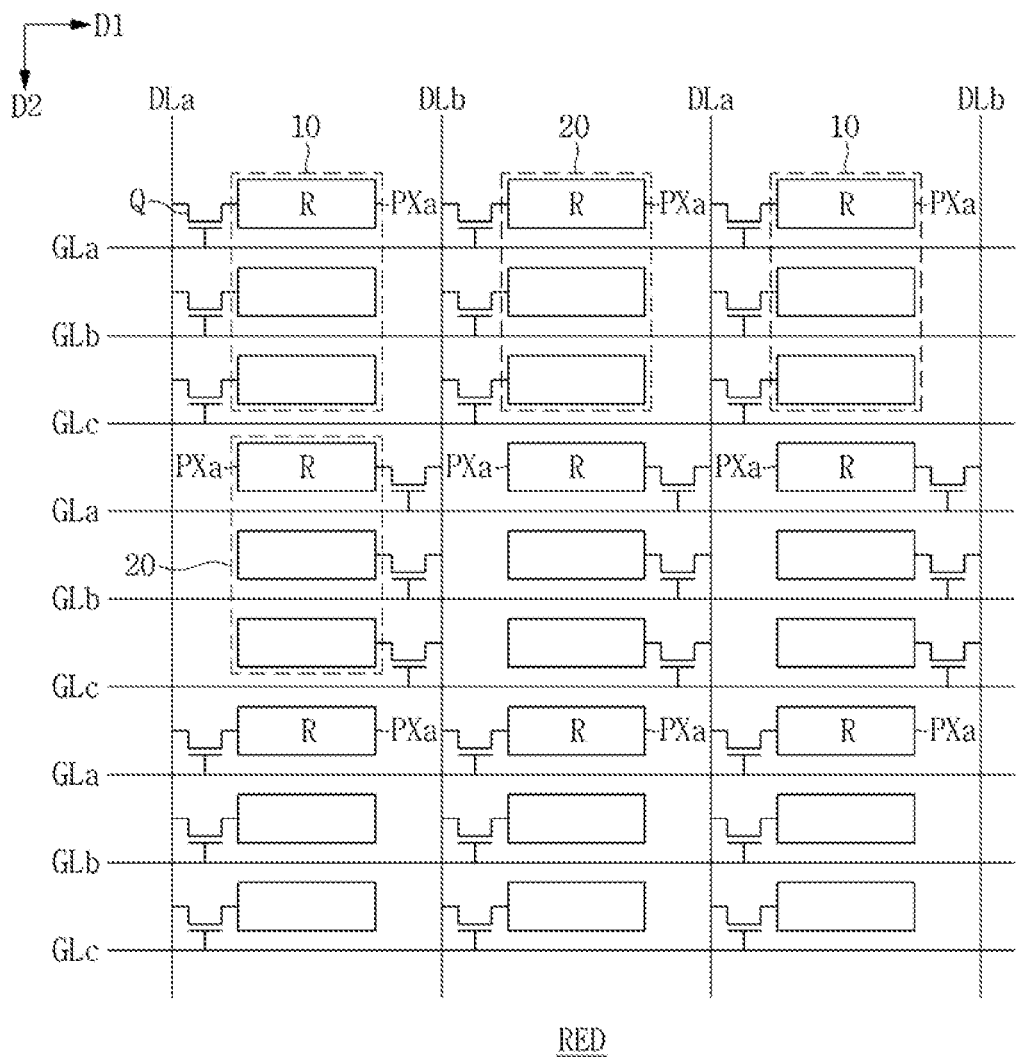
FIGS. 5A, 5B and 5C are views illustrating polarity application for each color of the display device according to an exemplary embodiment.
Figure 5B:
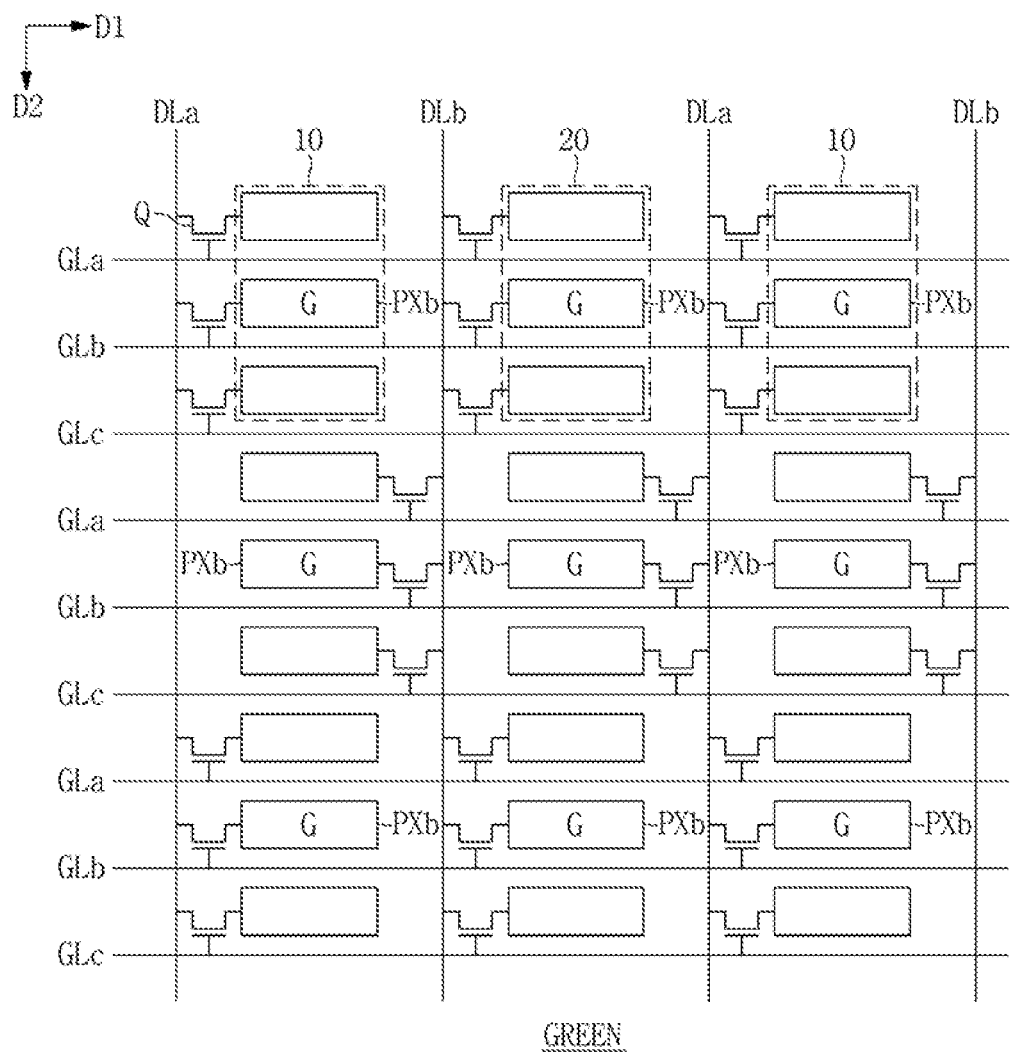
Figure 5C:
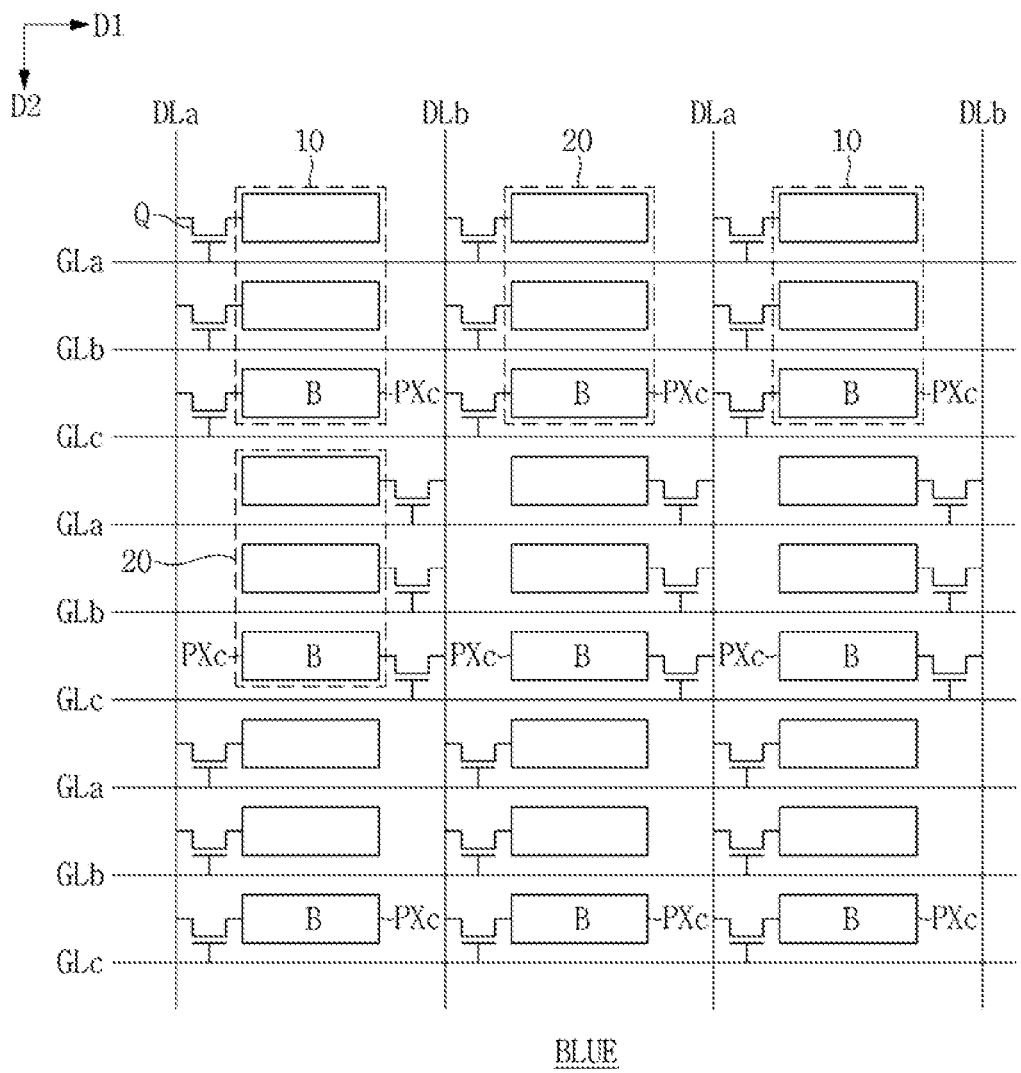
Figure 6:
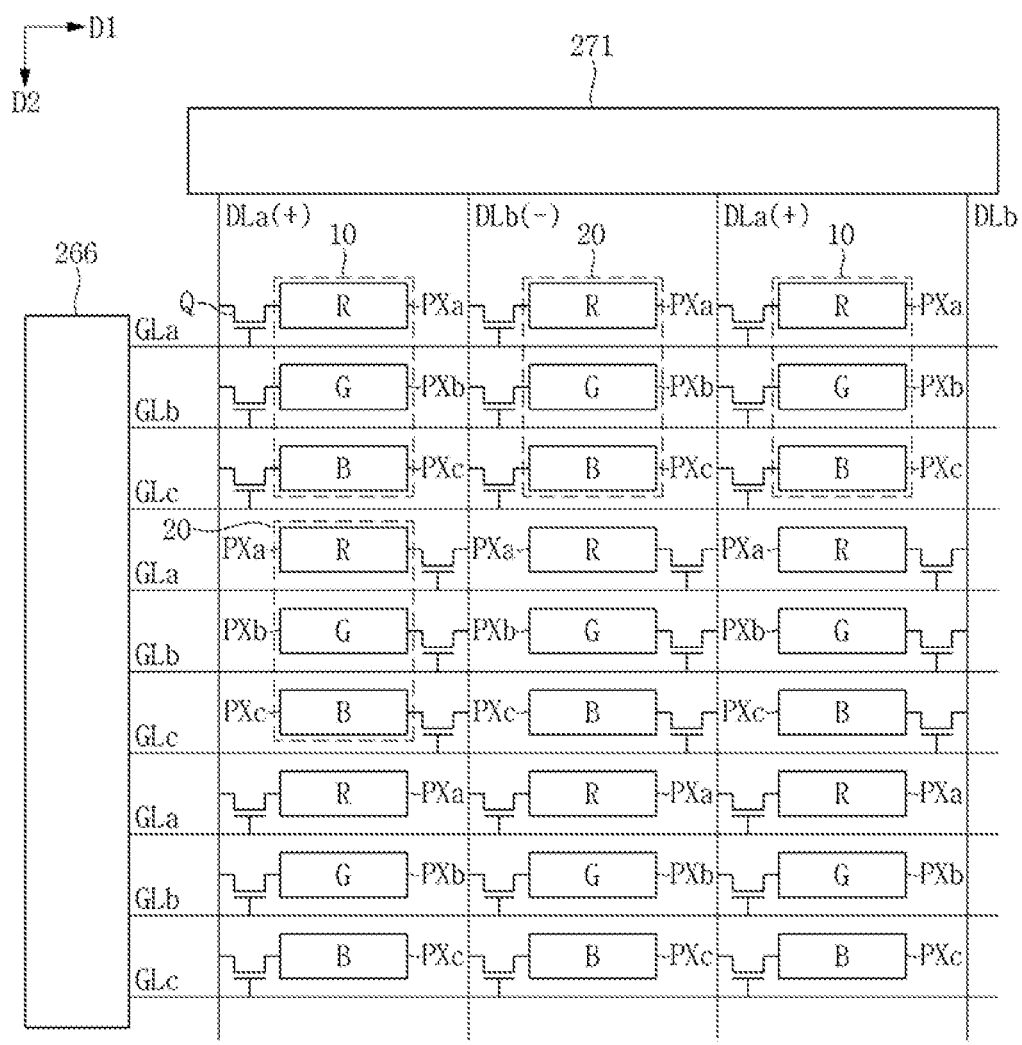
FIG. 6 is a view illustrating polarity application of the display device according to an exemplary embodiment and FIGS. 7A and 7B are views illustrating a data signal and a charge amount of a pixel according to the data signal according to the conventional art and an exemplary embodiment of the present inventive concept.

FIG. 3 is a view illustrating a connection relationship between a gate control line and a gate driver of FIG. 1, FIGS. 4A, 4B and 4C are views illustrating waveforms of various signals applied to the gate control line of FIG. 3 and gate signals output from the gate driver of FIG. 3, FIGS. 5A, 5B and 5C are views illustrating polarity application for each color of the display device according to an exemplary embodiment, and FIG. 6 is a view illustrating polarity application of the display device according to an exemplary embodiment.

The gate control line 911, as illustrated in FIG. 3, includes a first clock line CL1, a second clock line CL2, a third clock line CL3, a fourth clock line CL4, a fifth clock line CL5, a sixth clock line CL6, a seventh clock line CL7, an eighth clock line CL8, a ninth clock line CL9, a tenth clock line CL10, an eleventh clock line CL11, a twelfth clock line CL12, a base line VSL, a first start line STL1, a second start line STL2, and a third start line STL3.

As illustrated in FIGS. 4A, 4B and 4C, the first, second, third, fourth, fifth, sixth, seventh, eighth, ninth, tenth, eleventh and twelfth clock lines CL1, CL2, CL3, CL4, CL5, CL6, CL7, CL8, CL9, CL10, CL11, and CL12 transmit first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12, respectively, and the first, second, and third start lines STL1, STL2, and STL3 transmit first, second, and third start vertical signals STV1, STV2 and STV3. The first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12 and the first, second, and third start vertical signals STV1, STV2, and STV3 are supplied from the timing controller 606. A high voltage of each of the first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12 corresponds to a high voltage of the gate signal.

The first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12 are output sequentially, and particularly, in a repetitive manner. That is, the first, second, third, fourth, fifth, sixth, seventh, eighth, ninth, tenth, eleventh, and twelfth clock signals CK1, CK2, CK3, CK4 CK5, CK6, CK7, CK8, CK9, CK10, CK11, and CK12 are output sequentially from the first clock signal CK1 to the twelfth clock signal CK12, and output sequentially from the first clock signal CK1 to the twelfth clock signal CK12 again.

High periods of the clock signals that are output in adjacent periods may overlap each other. For example, a period corresponding to latter five sixths of a pulse width of the first clock signal CK1 and a period corresponding to former five sixths of a pulse width of the second clock signal CK2 overlap each other.

The seventh, eighth, ninth, tenth, eleventh, and twelfth clock signals CK7, CK8, CK9, CK10, CK11, and CK12 have phases that are inverted, i.e., shifted by 180 degrees, with respect to the first, second, third, fourth, fifth, and sixth clock signals CK1, CK2, CK3, CK4, CK5, and CK6, respectively. For example, the seventh clock signal. CK7 is inverted, i.e., shifted by 180 degrees, with respect to the first clock signal CK1, the eighth clock signal CK8 is inverted, i.e., shifted by 180 degrees, with respect to the second clock signal CK2, the ninth clock signal CK9 is inverted, i.e., shifted by 180 degrees, with respect to the third clock signal CK3, and the tenth, clock signal CK10 is inverted, i.e., shifted by 180 degrees, with respect to the fourth clock signal CK4, the eleventh clock signal CK11 is inverted, i.e., shifted by 180 degrees, with respect to the fifth clock signal CK5, and the twelfth clock signal CK12 is inverted, i.e., shifted by 180 degrees, with respect to the sixth clock signal CK6.

While each of the first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12 is output a plurality of times in a single frame period, each of the first, second, and third start vertical signals STV1, STV2, and STV3 is output only once in a single frame period. In other words, while each of the first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12 has an active state (a high voltage a plurality of times during a single frame period, each of the first, second, and third start vertical signals STV1, STV2, and STV3 has an active state (a high voltage) only once during a single frame period.

The base line VSL is connected to each of first, second, third, fourth, fifth, sixth, seventh, eighth, ninth, tenth, eleventh, and twelfth stages ST1, ST2, ST3, ST4, ST5, ST6, ST7, ST8, ST9, ST10, ST11, and ST12 of the gate driver 266. The base line VSL is located on a layer substantially the same as a layer on which the first, second, third, fourth, fifth, sixth, seventh, eighth, ninth, tenth, eleventh, and twelfth clock lines CL1, CL2, CL3, CL4, CL5, CL6, CL7, CL8, CL9, CL10, CL11, and CL12 are disposed. Although not illustrated, the base line VSL may be connected to each of the stages ST1, ST2, ST3, ST4, ST5, ST6, ST7, ST8, ST9, ST10, ST11, and ST12 through a contact hole, a connection line, and a conductive film.

The gate driver 266 includes a shift register. The shift register includes the plurality of stages ST1, ST2, ST3, ST4, ST5, ST6, ST7, ST8, ST9, ST10, ST11, and ST12.

In an exemplary embodiment, (3m−2)-th stages of the plurality of stages ST1, ST2, ST3, ST4, ST5, ST6, ST7, ST8, ST9, ST10, ST11, and ST12 are connected to each other, (3m−1)-th stages of the plurality of stages ST1, S12, ST3, ST4, ST5, ST6, ST7, ST8, ST9, ST10, ST11, and ST12 are connected to each other, and 3m-th stages of the plurality of stages ST1, ST2, ST3, ST4, ST5, ST6, ST7, ST8, ST9, ST10, ST11, and ST12 are connected to each other, where m is a natural number. For example, as illustrated in FIG. 3, the first stage ST1, the fourth stage ST4, the seventh stage ST7, and the tenth stage ST10, which are the (3m−2)-th stages, are connected to each other, the second stage ST2, the fifth stage ST5, the eighth stage ST8, and the eleventh stage ST11, which are the (3m−1)-th stages, are connected to each other, and the third stage ST3, the sixth stage ST6, the ninth stage ST9, the twelfth stage ST12, which are the 3m-th stages, are connected to each other.

In other words, a (q+3)-th stage receives a gate signal output from a q-th stage as the start signal to be set, and the set stage outputs a clock signal applied thereto as a gate signal, where q is a natural number. For example, when the first stage ST1 is set by the first start vertical signal STV1 and outputs the first gate signal GS1, the fourth stage ST4 receives the first gate signal GS1 output from the first stage ST1 as the start signal to be set and receives the second clock signal CK2 to output, the fourth gate signal GS4. Subsequently, the seventh stage ST7 receives the fourth gate signal GS4 output from the fourth stage ST4 as the start signal to be set, and receives the third clock signal CK3 to output the seventh gate signal GS7. The tenth stage ST10 receives the seventh gate signal GS7 output from the seventh stage ST7 as the start signal to be set, and receives the fourth clock signal CK4 to output the tenth gate signal GS10.

The first stage ST1, the second stage ST2 and the third stage ST3 receive the first start vertical signal STV1, the second start vertical signal STV2 and the third start vertical signal STV3, respectively, as the start signal. That is, the first stage ST1 is connected to the first start time STL1 to receive the first start vertical signal STV1, the second stage ST2 is connected to the second start line STL2 to receive the second start vertical signal STV2, and the third stage ST3 is connected to the third start line STL3 to receive the third start vertical signal STV3.

Each of the stages ST1, ST2, ST3, ST4, ST5, ST6, ST7, ST8, ST9, ST10, ST11, and ST12 receives one of the first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12 to generate first, second, third, fourth, fifth, sixth, seventh, eighth, ninth, tenth, eleventh, and twelfth gate signals GS1, GS2, GS3, GS4, GS5, GS6, GS7, GS8, GS9, GS10, GS11, and GS12, respectively. According to an exemplary embodiment, a (12a+1)-th stage, a (12a+2)-th stage and a (12a+3)-th stage (e.g., the first, second, and third stages ST1, ST2, and ST3) receive the first clock signal CK1 to output gate signals (e.g., the first, second, and third gate signals GS1, GS2, and GS3), respectively, a (12a+4)-th stage, a (12a+5)-th stage and a (12a+6)-th stage (e.g., the fourth, fifth, and sixth stages ST4, ST5, and ST6) receive the second clock signal CK2 to output gate signals (e.g., the fourth, fifth, and sixth gate signals GS4, GS5, and GS6), respectively, a (12a+7)-th stage, a (12a+8)-th stage and a (12a+9)-th stage (e.g., the seventh, eighth, and ninth stages ST7, ST8, and ST9) receive the third clock signal CK3 to output gate signals (e.g., the seventh, eighth, and ninth gate signals GS7, GS8, and GS9), respectively, and a (12a+10)-th stage, a (12a+11)-th stage and a (12a+12)-th stage (e.g., the tenth, eleventh, and twelfth stages ST10, ST11, and ST12) receive the fourth clock signal CK4 to output gate signals (e.g., the tenth, eleventh, and twelfth gate signals GS10, GS11, and GS12), respectively, where a is a natural number including 0. However, exemplary embodiments are not limited thereto, and the stages ST1, ST2, ST3, ST4, ST5, ST6, ST7, ST8, ST9, ST10, ST11, and ST12 may receive different clock signals of the first, second, third, fourth, fifth, sixth, seventh, eighth, ninth, tenth, eleventh, and twelfth clock signals CK1, CK2, CK3, CK4, CK5, CK6, CK7, CK8, CK9, CK10, CK11, and CK12, respectively.

As described above, the gate driver 266 may receive the clock signals CK1, CK2, CK3, CK4, CK5, CK6, CK7, CK8, CK9, CK10, CK11, and CK12 of 12 phases, but the number of phases of the clock signals is not limited thereto. That is, the gate driver 266 may receive clock signals of r phases, where r is a natural number greater than one.

The first stage ST1, which is a first (3m−2)-th stage, is set by the first stall vertical signal STV1 and the remaining (3m−2)-th stages are set sequentially along the second direction D2 by the previous gate signal of the (3m−2)-th stage. Accordingly, the (3m−2)-th stages which are set receive one of the clock signals CK1, CK2, CK3, CK4, CK5, CK6, CK7, CK8, CK9, CK10, CK11, and CK12 and output (3m−2)-th gate signals sequentially along the second direction D2.

The second stage ST2, which is a first (3m−1)-th stage, is set by the second start vertical signal STV2 and the remaining (3m−1)-th stages are set sequentially along the second direction D2 by the previous gate signal of the (3m−1)-th stage. Accordingly, the (3m−1)-th stages which are set receive one of the clock signals CK1 CK2, CK3, CK4, CK5, CK6, CK7, CK8, CK9, CK10, CK11, and CK12 and output (3m−1)-th gate signals sequentially along the second direction D2.

The third stage ST3, which is a first 3m-th stage, is set by the third start vertical signal STV3 and the remaining 3m-th stages are set sequentially along the second direction D2 by the previous gate signal of the 3m-th stage. Accordingly, the 3m-th stages which are set receive one of the clock signals CK1, CK2, CK3, CK4, CK5, CK6, CK7, CK8, CK9, CK10 CK11, and CK12 and output 3m-th gate signals sequentially along the second direction D2.

Referring to FIGS. 4A and 5A, the first color pixel PXa representing the first color R is turned on by the first start vertical signal STV1.

For example, when a data enable signal DE becomes active (a high voltage), the first start vertical signal STV1 becomes an active state (a high voltage). The first stage ST1 which is set by the first start vertical signal STV1 outputs the first gate signal GS1 and the first gate signal GS1 is applied to a first gate line GLa of the plurality of first gate lines GLa that is disposed firstly along the second direction D2. Accordingly, a plurality of first color pixels PXa of the plurality of first color pixels PXa that are disposed firstly along the second, direction D2 are turned on. The plurality of first color pixels PXa that are turned on are arranged along the first direction D1.

Subsequently, the fourth stage ST4 which is set by the first gate signal GS1 outputs the fourth gate signal GS4 and the fourth gate signal GS4 is applied to a first gate line GLa of the plurality of first gate lines GLa that is disposed secondly along the second direction D2. Accordingly, a plurality of first color pixels PXa the plurality of first color pixels PXa that are disposed secondly along the second direction D2 are turned on. The plurality of first color pixels PXa that are turned on are arranged along the first direction D1.

Subsequently, the seventh stage ST7 which is set by the fourth gate signal GS4 outputs the seventh gate signal GS7 and the seventh gate signal GS7 is applied to a first gate line GLa of the plurality of first gate lines GLa that is disposed thirdly along the second direction D2. Accordingly, a plurality of first color pixels PXa of the plurality of first color pixels PXa that are disposed thirdly along the second direction D2 are turned on. The plurality of first color pixels PXa that are turned on are arranged along the first direction D1.

The above-described process is repeated sequentially along the second direction D2 until the entirety of the first color pixels PXa disposed at the display panel 100 are turned on. That is, the above process is repeated until a last gate signal (e.g., a gate signal GS6478) of the first color pixel PXa is applied to a first gate line GLa that is disposed lastly along the second direction D2, and a plurality of first color pixels PXa of the plurality of first color pixels PXa that are disposed lastly along the second direction D2 are turned on. The second vertical start signal STV2 may become an active state (a high voltage) substantially simultaneously with the last gate signal (e.g., the gate signal GS6478).

Referring to FIGS. 4B and 5B, the second color pixel PXb representing the second color G is turned, on by the second vertical start signal STV2.

For example, when the gate signal GS6478 is applied to the last first color, pixels PXa, the second start vertical signal STV2 becomes an active state (a high voltage). The second stage ST2 which is set by the second start vertical signal STV2 outputs the second gate signal GS2 and the second gate signal GS2 is applied to a second gate line GLb of the plurality of second gate lines GLb that is disposed firstly along the second direction D2. Accordingly, a plurality of second color pixels PXb that are disposed firstly along the second direction D2 are turned on. The plurality of second color pixels PXb that are turned on are arranged along the first direction D1.

Subsequently, the fifth stage ST5 which is set by the second gate signal GS2 outputs the fifth gate signal GS5 and the fifth gate signal GS5 is applied to a second gate line GLb of the plurality of second gate lines GLb that is disposed secondly along the second direction D2. Accordingly, a plurality of second color pixels PXb of the plurality of second color pixels PXb that are disposed secondly along the second direction D2 are turned on. The plurality of second color pixels PXb that are turned on are arranged along the first direction D1.

Subsequently, the eighth stage ST8 which is set by the fifth gate signal GS5 outputs the eighth gate signal GS8 and the eighth gate signal GS8 is applied to a second gate line GLb of the plurality of second gate lines GLb that is disposed thirdly along the second direction D2. Accordingly, a plurality of second color pixels PXb of the plurality of second color pixels PXb that are disposed thirdly along the second direction D2 are turned on. The plurality of second color pixels PXb that are turned on are arranged along the first direction D1.

The above-described process is repeated sequentially along the second direction D2 until the entirety of the second color pixels PXb disposed at the display panel 100 are turned on. That is, the above process is repeated until a last gate signal e.g., a gate signal GS6479) of the second color pixel PXb is applied to a second gate line GLb that is disposed lastly along the second direction D2, and a plurality of second color pixels PXb of the plurality of second color pixels PXb that are disposed lastly along the second direction D2 are turned on. The third vertical start signal STV3 may become an active state (a high voltage) substantially simultaneously with the last gate signal e.g., the gate signal GS6479).

Referring to FIGS. 4C and 5C, the third color pixel PXc representing the third color B is turned on by the third vertical start signal STV3.

For example, when the gate signal GS6479 is applied to the last second color pixels PXb, the third start vertical signal STV3 becomes an active state (a high voltage). The third stage ST3 which is set by the third start vertical signal STV3 outputs the third gate signal GS3 and the third gate signal GS3 is applied to a third gate line GLc of the plurality of third gate lines GLc that is disposed firstly along the second direction D2. Accordingly, a plurality of third color pixels PXc that are disposed firstly along the second direction D2 are turned on. The plurality of third color pixels PXc that are turned on are arranged along the first direction D1.

Subsequently, the sixth stage ST6 which is set by the third gate signal GS3 outputs the sixth gate signal GS6 and the sixth gate signal GS6 is applied to a third gate line GLc of the plurality of third gate lines GLc that is disposed secondly along the second direction D2. Accordingly, a plurality of third color pixels PXc that are disposed secondly along the second direction D2 are turned on. The plurality of third color pixels PXc that are turned on are arranged along the first direction D1.

Subsequently, the ninth stage ST9 which is set by the sixth gate signal GS6 outputs the ninth gate signal GS9 and the ninth gate signal GS9 is applied to a third gate line GLc of the plurality of third gate lines GLc that is disposed thirdly along the second direction D2. Accordingly, a plurality of third color pixels PXc of the plurality of third color pixels PXc, that are disposed thirdly along the second direction D2 are turned on. The plurality of third color pixels PXc that are turned on are arranged along the first direction D1.

The above-described process is repeated sequentially along the second direction D2 until the entirety of the third color pixels PXc disposed at the display panel 100 are turned on. That is, the above process is repeated until a last gate signal (e.g., a gate signal GS6480) of the third color pixel PXc is applied to a third gate line GLc that is disposed lastly along the second direction D2, and a plurality of third color pixels PXc of the plurality of third color pixels PXc that are disposed lastly along the second direction D2 are turned on. The first vertical, start signal STV1 may become an active state (a high, voltage) again substantially simultaneously with the last gate signal (e.g., the gate signal GS6480) again.

That is, according to an exemplary embodiment, the plurality of first color pixels PXa representing the first color R are driven sequentially along the second direction D2 according to the first start vertical signal STV1, the plurality of second color pixels PXb representing the second color G are driven sequentially along the second direction D2 according to the second start vertical signal STV2, and the plurality of third color pixels PXc representing the third color B are driven sequentially along the second direction D2 according to the third start vertical signal STV3. In addition, the plurality of first color pixels PXa representing the first color R, the plurality of second color pixels PXb representing the second color G and the plurality of third color pixels PXc representing the third color B are driven sequentially.

FIG. 6 is a view illustrating polarity application of the display device according to an exemplary embodiment.

Referring to FIG. 6, the first pixel group 10 and the second pixel group 20 that are adjacent to each other along the second direction D2 are connected to different data lines to which data voltage having different polarities are applied. That is, the first pixel group 10 receives a positive data voltage (+) from the first data line DLa and the second pixel group 20 receives a negative data voltage (−) from the second data line DLb. Accordingly, the first pixel group 10 and the second pixel group 20 that are adjacent to each other receive data voltages having different polarities.

Accordingly, pixel groups adjacent to each other along the first direction D1 and the second direction D2 may receive data voltages having different polarities to implement a dot inversion, scheme of pixel groups, thereby improving the display quality of the display device according to an exemplary embodiment.

Figure 7A:
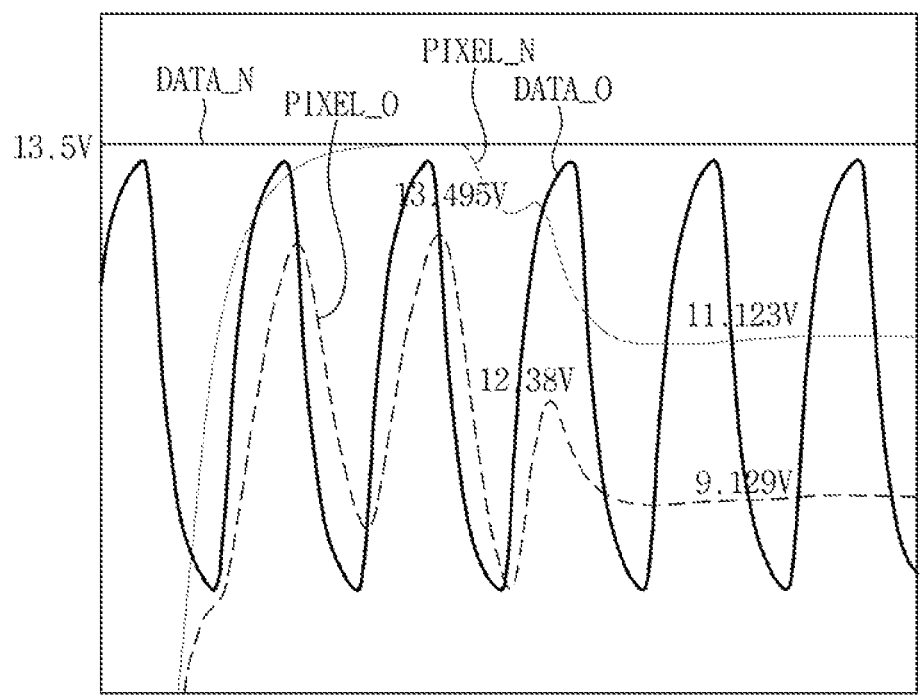
Figure 7B:
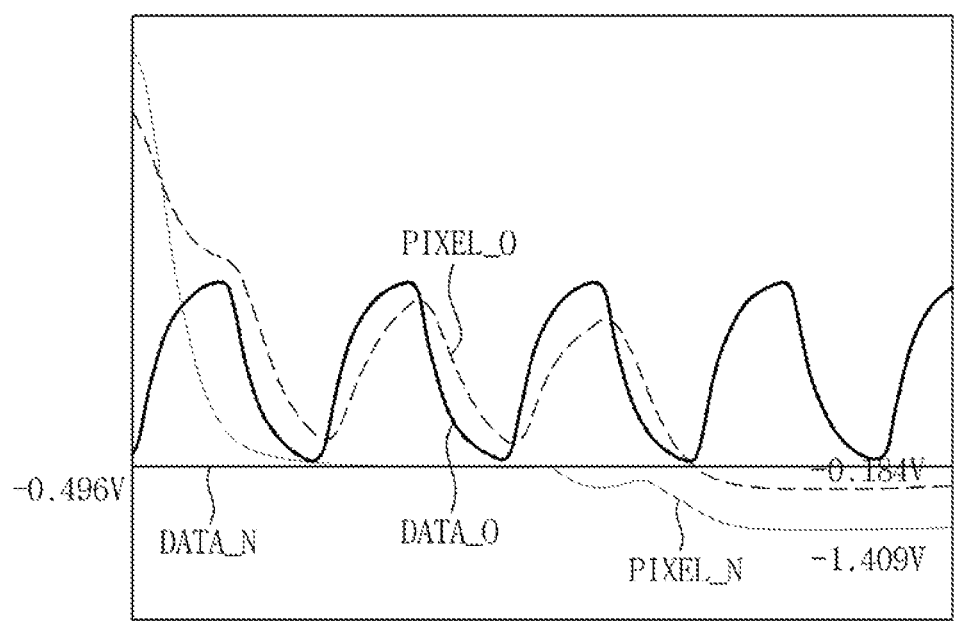

FIGS. 7A and 7B are views illustrating a data signal and a charge amount of a pixel according to the data signal according to the conventional art and an exemplary embodiment of the present inventive concept.

FIG. 7A is a view illustrating a positive voltage applied to one pixel and a charge amount of the pixel based on the positive voltage according to a conventional art and an exemplary embodiment of the present inventive concept. Conventionally, since gate signals are applied sequentially along the second direction D2, data signals of different colors are sequentially applied to the data line. According to an exemplary embodiment, since gate signals are sequentially applied to first color pixels PXa representing a first color, then to second color pixels PXb representing a second color, and then to third color pixels PXc representing a third color, data signals of a same color are sequentially applied to the data line. In such an exemplary embodiment, an amount of change of the data signal applied to pixels that represent the same color and are arranged adjacent to each other is relatively not large.

That is, as illustrated in FIGS. 7A and 7B, a conventional data signal DATA_O may be output as an AC waveform, while a data signal DATA_N according to an exemplary embodiment may be output as a DC waveform.

Accordingly, when comparing a pixel voltage PIXEL_N applied to a pixel according to an exemplary embodiment of the present inventive concept and a pixel voltage PIXEL_O applied to a conventional pixel, the charge amount of the conventional pixel is about 82% of the charge amount of the pixel according to an exemplary embodiment. Accordingly, it may be appreciated that the charge amount is improved in an exemplary embodiment of the present inventive concept.

As set forth hereinabove, in a display device and a method of driving the display device according to one or more exemplary embodiments, all the pixels representing a first color are sequentially driven, all the pixels representing a second color are sequentially driven after the pixels representing the first color are driven, and then all the pixels representing a third color are sequentially driven after the pixels representing the second color are driven, such that a charge rate of the pixels may be improved.

In addition, pixel groups adjacent to each other along an extension direction of a data line may receive voltages of different polarities to implement a dot inversion scheme, such that the display quality of the display device may be improved.

While the present inventive concept has been illustrated and described with reference to the exemplary embodiments thereof, it will be apparent to those of ordinary skill in the art that various changes in form and detail may be formed thereto without departing from the spirit and scope of the present inventive concept.

What is claimed is:

1. A display device comprising:
   a plurality of first color pixels representing a first color;
   a plurality of second color pixels representing a second color;
   a plurality of third color pixels representing a third color;
   a plurality of gate lines
   comprising first gate lines comprising a set of (3m−2)-th gate lines, second gate lines comprising a set of (3m−1)-th gate lines, and third gate lines comprising a set of 3m-th gate lines, m being a natural number and extending along a first direction, wherein the plurality of first color pixels are connected to the first gate lines, the plurality of second color pixels are connected to the second gate lines, and the plurality of third color pixels are connected to the third gate lines;
   a plurality of data lines comprising first data lines comprising a set of (2n−1)-th data lines and second data lines comprising a set of 2n-th data lines, n being a natural number, and extending along a second direction,
   wherein one of the (2n−1)-th data lines is connected to one of consecutive first pixels in a same column and one of the 2n-th data lines is connected to another of consecutive first pixels in the same column, one of the (2n−1)-th data lines is connected to one of consecutive second pixels in a same column and one of the 2n-th data lines is connected to another of consecutive second pixels in the same column, and one of the (2n−1)-th data lines is connected to one of consecutive third pixels in a same column and one of the 2n-th data lines is connected to another of consecutive the third pixels in the same column,
   a gate driver comprising first stage is connected to first gate line of the set of (3m−2)-th gate lines, second stage is connected to first gate line of the set of (3m−1)-th gate lines, third stage is connected to first gate line of the set of 3m-th gate lines;
   a first start line connected to the first stage;
   a second start line connected to the second stage;
   a third start line connected to the third stage; and
   a data driver connected to the plurality of data lines.

2. The display device of claim 1, wherein the first color is red, the second color is green, and the third color is blue.

3. The display device of claim 1, comprising a first pixel group comprising one of the plurality of first color pixels, one of the plurality of second color pixels, and one of the plurality of third color pixels that are arranged adjacent to each other along the second direction, and a second pixel group comprising one of the plurality of first color pixels, one of the plurality of second color pixels, and one of the plurality of third color pixels that are arranged adjacent to the first pixel group along the second direction,
   wherein the first pixel group and the second pixel group are arranged alternately along the second direction and are connected to different data lines.

4. The display device of claim 3, wherein the first pixel group and the second pixel group are arranged alternately along the first direction and are connected to between the first and second data lines.

5. The display device of claim 4, wherein the first pixel group is connected to a first data line of the first data lines and the second pixel group is connected to a second data line of the second data lines which is disposed adjacent to the first data line.

6. The display device of claim 5, wherein the first data line and the second data line receive data voltages having different polarity respectively.

7. The display device of claim 6, further comprising a third pixel group comprising one of the plurality of first color pixels, one of the plurality of second color pixels, and one of the plurality of third color pixels that are arranged adjacent to each other along the second direction, the third pixel group being disposed adjacent to the first pixel group along the first direction, and a fourth pixel group comprising one of the plurality of first color pixels, one of the plurality of second color pixels, and one of the plurality of third color pixels that are arranged adjacent to the third pixel group along the second direction,
   wherein the third pixel group is connected to the second data line and the fourth pixel group is connected to a third data line disposed adjacent to the second data line, the third data line receives data voltage having the same polarity as the first data line.

8. The display device of claim 1, wherein the gate driver comprises a plurality of stages respectively corresponding to the plurality of gate lines,
   (3m−2)-th stages of the plurality of stages are connected to each other,
   (3m−1)-th stages of the plurality of stages are connected to each other, and
   3m-th stages of the plurality of stages are connected to each other.

9. The display device of claim 8, wherein the data line comprises a first data line and a second data line arranged alternately along the first direction, and
   the data driver applies a positive voltage to the first data line and a negative voltage to the second data line.

10. The display device of claim 1, further comprising a timing controller for driving the gate driver and the data driver.

11. The display device of claim 1, wherein lengths of the first color pixel, the second color pixel, and the third color pixel in the first direction are longer than lengths of the first color pixel, the second color pixel, and the third color pixel in the second direction, respectively.

12. The display device of claim 1, wherein the plurality of first color pixels, the plurality of second color pixels, and the plurality of third color pixels are driven sequentially.

13. The display device of claim 1, wherein a data voltage applied to the (2n−1)-th data lines has a different polarity from a data voltage applied to the 2n-th data lines.

14. A method of driving a display device, the method comprising:
   turning on a plurality of first color pixels using a first start signal output from a first start line;
   turning on a plurality of second color pixels using a second start signal output from a second start line;
   turning on a plurality of third color pixels using a third start signal output from a third start line; and
   wherein the plurality of first color pixels is connected to first gate lines, the plurality of second color pixels are connected to second gate lines, and the plurality of third color pixels are connected to third gate lines, wherein the first gate lines comprising a set of (3m−2)-th gate lines, the second gate lines comprising a set of (3m−1)-th gate lines, and the third gate lines comprising a set of 3m-th gate lines, m being a natural number and extending along a first direction, wherein the plurality of first color pixels, the plurality of second color pixels, and the plurality of third color pixels are connected to a plurality of data lines, wherein the plurality of data lines comprising first data lines comprising a set of (2n−1)-th data lines and second data lines comprising a set of 2n-th data lines, n being a natural number, and extending along a second direction, and wherein one of the (2n−1)-th data lines is connected to one of consecutive first pixels in a same column and one of the 2n-th data lines is connected to another of consecutive first pixels in the same column, one of the (2n−1)-th data lines is connected to one of consecutive second pixels in a same column and one of the 2n-th data lines is connected to another of consecutive second pixels in the same column, and one of the (2n−1)-th data lines is connected to one of consecutive third pixels in a same column and one of the 2n-th data lines is connected to another of consecutive the third pixels in the same column.

15. The method of claim 14, wherein turning on of the plurality of first color pixels using the first start signal output from the first start line comprises sequentially applying gate signals to the first gate line along the second direction, turning on of the plurality of second color pixels using the second start signal output from the second start line comprises sequentially applying gate signals to the second gate line along the second direction, and turning on of the plurality of third color pixels using the third start signal output from the third start line comprises sequentially applying gate signals to the third gate line along the second direction.

16. The method of claim 15, wherein the sequentially applying gate signals to the second gate line along the second direction is performed after sequentially applying gate signals to the first gate line along the second direction.

17. The method of claim 16, wherein the sequentially applying gate signals to the third gate line along the second direction is performed after sequentially applying gate signals to the second gate line along the second direction.

18. The method of claim 14, wherein the first color pixel is a red pixel, the second color pixel is a green pixel, and the third color pixel is a blue pixel.

* * * * *